US012783510B2

(12) United States Patent
Alexander

(10) Patent No.: US 12,783,510 B2
(45) Date of Patent: *Nov. 3, 2026

(54) AUTOMATED DATA INGESTION AND PROCESSING

(71) Applicant: Salesforce, Inc., San Francisco, CA (US)

(72) Inventor: Joshua David Alexander, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/082,603

(22) Filed: Mar. 18, 2025

(65) Prior Publication Data

US 2025/0225130 A1 Jul. 10, 2025

Related U.S. Application Data

(63) Continuation of application No. 18/162,450, filed on Jan. 31, 2023, now Pat. No. 12,265,530.

(51) Int. Cl.
*G06F 16/2452* (2019.01)
*G06F 16/25* (2019.01)

(52) U.S. Cl.
CPC ...... *G06F 16/24522* (2019.01); *G06F 16/258* (2019.01)

(58) Field of Classification Search
CPC ..................................................... G06F 16/254
USPC .......................................................... 707/602
See application file for complete search history.

(56) References Cited

U.S. PATENT DOCUMENTS 11,429,741 B2 8/2022 Hay et al.
11,561,987 B1 1/2023 Sager et al.
11,797,760 B1 * 10/2023 Hunn .................... G06F 40/186
2016/0085742 A1 3/2016 Mahmud et al.
2016/0098645 A1 4/2016 Sharma et al.
2017/0308792 A1 10/2017 Liang et al.
2019/0238532 A1 8/2019 Alexander et al.
(Continued)

FOREIGN PATENT DOCUMENTS

CA 3106353 A1 4/2020

*Primary Examiner* — Cam Linh T Nguyen
(74) *Attorney, Agent, or Firm* — Kowert, Hood, Munyon, Rankin & Goetzel, P.C.; Catherine L. Gerhardt; Dean M. Munyon

(57) ABSTRACT

The disclosed techniques automatically ingest new documents and store data extracted from the documents in a database for conversion into a different format. The disclosed techniques identify, via a backend API, newly released documents that include data for users and, based on the identifying, automatically ingest, via an ingestion call executed made by the backend API, the newly released documents. The disclosed techniques extract, using a computer vision model trained on different types of documents, a data from the newly released documents, where the extracting includes identifying locations within the documents from which to extract data. The disclosed techniques store the extracted data in the database storing data extracted from previously ingested documents for users in a text-based object format and convert, using a machine learning model trained on a plurality of metatags, data corresponding to a given user from the text-based object format to a queryable file format.

20 Claims, 7 Drawing Sheets

(56) References Cited

U.S. PATENT DOCUMENTS

| | | | |
|---|---|---|---|
| 2019/0364034 | A1 | 11/2019 | Alexander |
| 2020/0099682 | A1 | 3/2020 | Alexander et al. |
| 2020/0099696 | A1 | 3/2020 | Alexander et al. |
| 2022/0060465 | A1 | 2/2022 | Alexander et al. |
| 2022/0100772 | A1 | 3/2022 | Kadarundalagi Raghura et al. |
| 2022/0121821 | A1 | 4/2022 | Yaramada et al. |
| 2023/0059265 | A1 | 2/2023 | Watanabe |
| 2023/0103076 | A1 | 3/2023 | Zhou et al. |
| 2023/0394057 | A1 | 12/2023 | Tah et al. |
| 2024/0111946 | A1* | 4/2024 | Hunn .................... G06F 40/186 |

* cited by examiner

AUTOMATED DATA INGESTION AND PROCESSING

The present application is a continuation of U.S. application Ser. No. 18/162,450, entitled "Automated Data Ingestion and Processing," filed Jan. 31, 2023, the disclosure of which is incorporated by reference herein in its entirety.

BACKGROUND

Technical Field

This disclosure relates to data storage, in particular to techniques for automatically ingesting and processing data before converting it to a different format.

Description of the Related Art

Computer systems may include multiple computers, workstations, servers, and storage systems, each performing different tasks. For example, in some computer systems, a particular computer may be executing software for managing e-mail messages, while other workstations, in the computer systems, may be used for word processing, web browsing, database storage, and the like.

Databases are a common method for organizing stored data in computer systems. As new data is received it is added to the data stored in the computer systems in a format dictated by the format of the existing databases of the computer system. During operation of a computer system, multiple requestors generate requests to access a database. Such requests may include a request for retrieval of one or more particular records, the storage of a new record, or the removal of a previously stored record from the database. A computer executing a software program to manage the database may schedule data to be stored in the database according to the various requests for access to the database. During the execution of a particular request, the computer may traverse the database to retrieve or delete a desired set of data, or determine an appropriate location in which to add a new set of data.

DETAILED DESCRIPTION OF EMBODIMENTS

Figure 1:
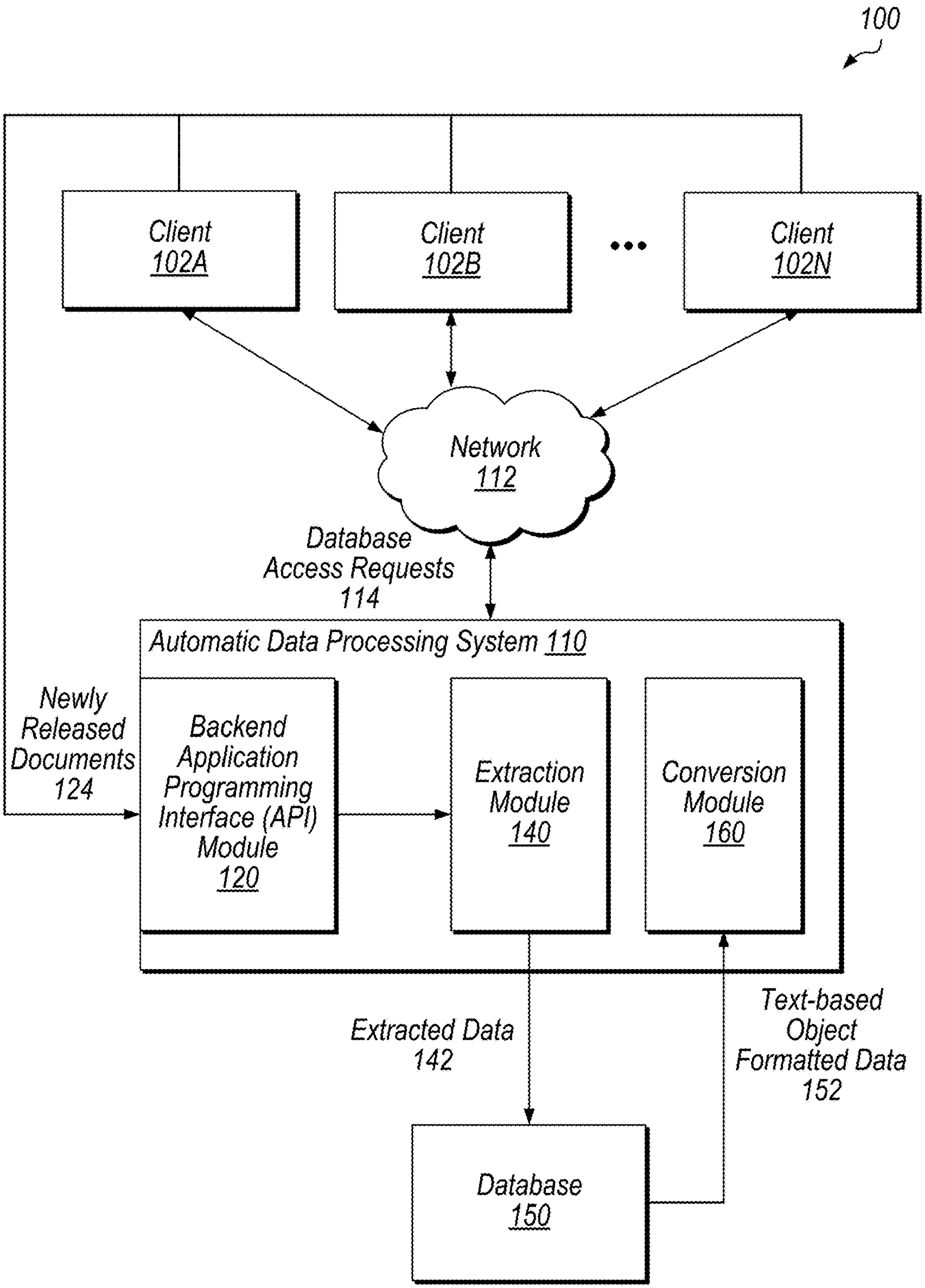
FIG. 1 is a block diagram illustrating an example system configured to automatically ingest and process documents, according to some embodiments.

While some documents, such as reports, are often immediately made available, some types of documentation may have a lag in release and may be released at arbitrary times. As one specific example, performance reports for public assets generally publish immediately, while performance reports for private investments publish with a lag. In addition to having a delayed or inconsistent release or publishing schedule, documents may be published in the form of a physical latter or a portable document format (PDF) (e.g., attached to an email). In general, entities attempting to process or ingest data from inconsistently released documents take the analog form (either a physical document or a PDF) of the documents and either scan or manually transcribe the reports (e.g., if it is a physical document), or enter portions of the report (e.g., if it is a PDF, docx, etc.) that are important and need to be stored in a database for future reference. When this is done on a larger scale for a vast number of entities (e.g., with 300, 500, 1000, etc. clients) having hundreds, thousands, millions of different documents, the scanning and entry of reports becomes immensely cumbersome (e.g., tens of thousands of rows of data input on a monthly or quarterly basis) and, in addition, is often inaccurate. Further, traditional document ingestion techniques often result in an even further lag in the availability of the documents, which may result in poor decisions being made based on the ingested documentation. As one specific example, if a portfolio manager is making an investment decisions and is relying on outdated or erroneously entered information (due to the lag of document publication or the slow and inaccurate document ingestion), this often results in loss for various clients as well as a loss in the reputation of the portfolio managers or the entity to which the correspond.

In order to provide a seamless and secure process for ingesting and storing data from documents, the disclosed techniques provide an ingestion software that can either receive uploaded documents (e.g., a user can drag and drop a PDF into a web service at Salesforce™) or can automatically ingest documents using an API plugin that creates a pipeline from an investment source (either by monitoring an account of the client at the document source (e.g., Chase bank) or by monitoring the email of the client) to the service cloud of the disclosed automatic ingestion system. Documents fed into the ingestion tool may be either native (e.g., in digital form such as a PDF or a word document) or may be non-native (e.g., a physical document that is scanned, and dragged and dropped into the ingestion tool). This tool may be executed as a web service e.g., at Salesforce.com. The disclosed ingestion tool then uses optical character recognition (OCR) or computer vision techniques to identify and extract important information from the documents.

Prior to using computer vision or OCR techniques to extract information from automatically ingested documents, the disclosed techniques may determine whether there is recognizable text and, if so, extract the text. Consequently, in some situations, the disclosed techniques perform multiple scans on a single document (and this document may include 100, 200, 500, 1000, etc. pages). In some situations, the initial assessment of automatically ingested documents is performed by computer vision techniques in addition to data extraction. After extracting information from the documents, the ingestion tool stores the information in a non-relational database e.g., in a JavaScript object notation (JSON) format. For example, the ingestion tool identifies various names, credentials, account numbers, value changes, etc. from documents for various different users and stores this information as JSON objects.

In various embodiments, the disclosed automatic ingestion and conversion system provides a quick and accurate method for updating and provide data from two different formats in a format that is native or easily digested. For example, data retrieved from the disclosed database is converted to a format that is quickly queryable and indexable for an end user, which in turn improves user experience. Similarly, the disclosed techniques may advantageously reduce delays in data retrieval due to the automatic ingestion and conversion system extracting and storing data in a format that is native to a preexisting database (e.g., that may be storing manually retrieved and extracted data) as well as converting the natively formatted data in order to provide the data in a format that is more friendly to data processing by end users. The disclosed techniques may advantageously improve the accuracy of data ingestion. An exemplary application of these techniques will now be discussed, starting with reference to FIG. 1.

As used herein, the term "computer vision model" is intended to be construed according to its well-understood meaning which includes a machine learning or artificial intelligence model that is designed to identify visual information from the content an image or a video, and provide a prediction based on the identified visual information. In disclosed techniques, computer vision is also used on documents which may be in a non-image format, such as a PDF or docx document format. Use of a computer vision model in the disclosed techniques includes training of a machine learning model. As used herein, the term "application programming interface" is intended to be construed according to its well-understood meaning, which includes software that has the distinct function of being an intermediary that allows two different entities to communicate with one another via requests and responses. The two entities may be computer programs. Documentation that describes how to build or use these connections/interfaces are often referred to as API specifications. In disclosed techniques, the term "document" is intended to be construed according to its well-understood meaning, which includes a computer readable medium including content that is displayable to end users, including documents with both text and images. Alternatively and as an example, the disclosed ingestion system may ingest a medical report that includes images and graphs, but does not include text.

Example Data Processing System

Turning now to FIG. 1, a block diagram of an example system configured to automatically ingest and process documents is shown. Within system 100, a network 112 may represent the Internet, an intranet, or any other suitable type of computer network. The network 112 may couple one or more clients 102A-102N to an automatic data processing system 110. Automatic data processing system 110 may be an enterprise system that is coupled to a plurality of client computers 102A-102N via network 112 to allow these clients to interact with and request information from system 110 (e.g., request data stored in database 150). Note that clients 102A-102N may be clients of system 110, including users of entities utilizing software provided by system 110 or may be end users that are clients of various entities utilizing system 110. As one specific example, an entity may utilize system 110 to accomplish various software needs, including e.g., customer relationship management (CRM). System 100 includes a database 150 which may be managed by a database server (not shown) included in system 110. The database server managing database 150 and may be referred to as a "database system" or "database computer system" or "database store" and may include a transaction log, a log structure merge (LSM) tree, etc. for managing a flow of data from system 110 to database 150. In other embodiments, automatic data processing system 110 is a database server. In various embodiments, clients may be requestors to the system 110, which includes connecting to the database 150 to perform various database operations (such as retrieving data). Client connections with the system 110 allows for these clients to request read or write operations, for example.

Automatic data processing system 110, in the illustrated embodiment, includes backend application programming interface (API) module 120, extraction module 140, and conversion module 160. Background API module 120 receives newly released documents 124 from client computing devices 120A-120N. For example, system 110 generates a pipeline from client devices 120A-102N by injecting a backend API into appropriate software (e.g., applications or web browsers) of respective client devices. System 110 executes module 120 to ingest newly released documents from these APIs. Backend API module 120 then provides these documents 124 to extraction module 140. The newly released documents may include one or more types of the following types of documents: private equity investment reports, invoices, quality control documents, accounting documents, medical records, legal portfolios, etc.

Extraction module 140 extracts various data from the newly released documents 124 and system 110 stores the extracted data 142 in database 150. As discussed in further detail below with reference to FIG. 3, extraction module 140 uses various machine learning techniques to identify document types, identify locations of information within different types of documents and pull the identified data from these newly released documents. In some embodiments, database 150 is a non-relational database storing data in a text-based object format. For example, database 150 may store extracted data 142 in a JSON format (e.g., as arrays within JSON objects). In other embodiments, database 150 is a relational database storing extracted data 142 in one or more tables having columns corresponding to different attributes of the extracted data 142 and rows storing values for the different attributes e.g., for a given user.

Conversion module 160, in the illustrated embodiment, retrieves text-based object (e.g., JSON) formatted data from database 150. Conversion module 160 then converts the retrieved data (e.g., extracted data 142 and various previously extracted data retrieved from database 150) to a different format. For example and as discussed below in further detail with reference to FIG. 4, conversion module 160 converts text-based object formatted data to a queryable file format (e.g., CSV or excel file). The queryable file format is a form of documentation that is easily searched, manipulated, and summarized e.g., by system 110 or by a user of a client device 102A. In various embodiments, automatic data processing system 110 provides a tool for automatically and quickly ingesting users' documents without the user being involved in the ingestion and processing. As one specific example, a user Josh may receive a new prescription from his doctor via email and system 110 automatically ingests this new prescription via a backend API plugged into Josh's email application (or web browser) and extracts important details from the prescription (e.g., patient name, patient prescription/medication, prescribing doctor, patient insurance information, etc.). In this example, after Josh's prescription data is automatically extracted, system 110 stores this information in the same format as any potentially previously extracted/stored prescription data for Josh (e.g., in database 150). Further in this example, system 110 retrieves and converts data for Josh (e.g., at his or another doctor's request) from the database 150 in order to provide Josh's most recent (or historical) prescription information to a new doctor Josh is now visiting.

Example Backend API Ingestion

When a system, such as automatic data processing system 110 ingests newly released documents, they may be newly release at or from various different sources. For example, one entity may upload newly released documents to a cloud storage platform, while another entity may send newly released documents via email. An embodiment of methods for monitoring and automatically ingesting newly released documents is depicted in the block diagram of FIG. 2.

In the illustrated embodiment, automatic data processing system 110 receives newly released documents from three different user devices 210A, 210B, and 210C. Specifically, backend API module 120 installs an API plugin 214A in an application 212A of user device 210A and this API plugin identifies and transmits a newly released document 224A that includes data for multiple users (e.g., both Josh and John) to backend API module 120. Application 212A may be, for example, an application downloaded from an app store on a user's device. For example, application 212A may be an app downloaded on a user's smartphone that corresponds to a given entity (e.g., a business such as Chase.com). In one specific example, the newly released document 224A may include an investment report for Josh and his son John. Similarly, backend API module 120 installs an API plugin 214B in web browser 212B. API plugin 214B identifies and transmits a newly released document 224B that includes data for a single user to module 120. The web browser 212B may be utilized by an end user to navigate, e.g., to a web browser version of a cloud storage service (e.g., Google Drive) or a website of an institution (e.g., Chase.com). Module 210 also receives a newly released document 224C from user device 210C via a drag and drop element 212C displayed by backend API module 120 via a user interface of device 210C. This user interface element 212C allows the user of device 210C to share new documents directly with system 110 (e.g., if they receive a new document via email). In other embodiments, a user of a fourth device scans or takes a picture of a physical letter using their device and then drags and drops this scanned document or image via the element 212C. In such embodiments, once the user has scanned the physical document, an API plugin identifies the new media on the user's device and automatically ingests this new media as a document (e.g., an image) for data extraction and conversion.

Figure 2:
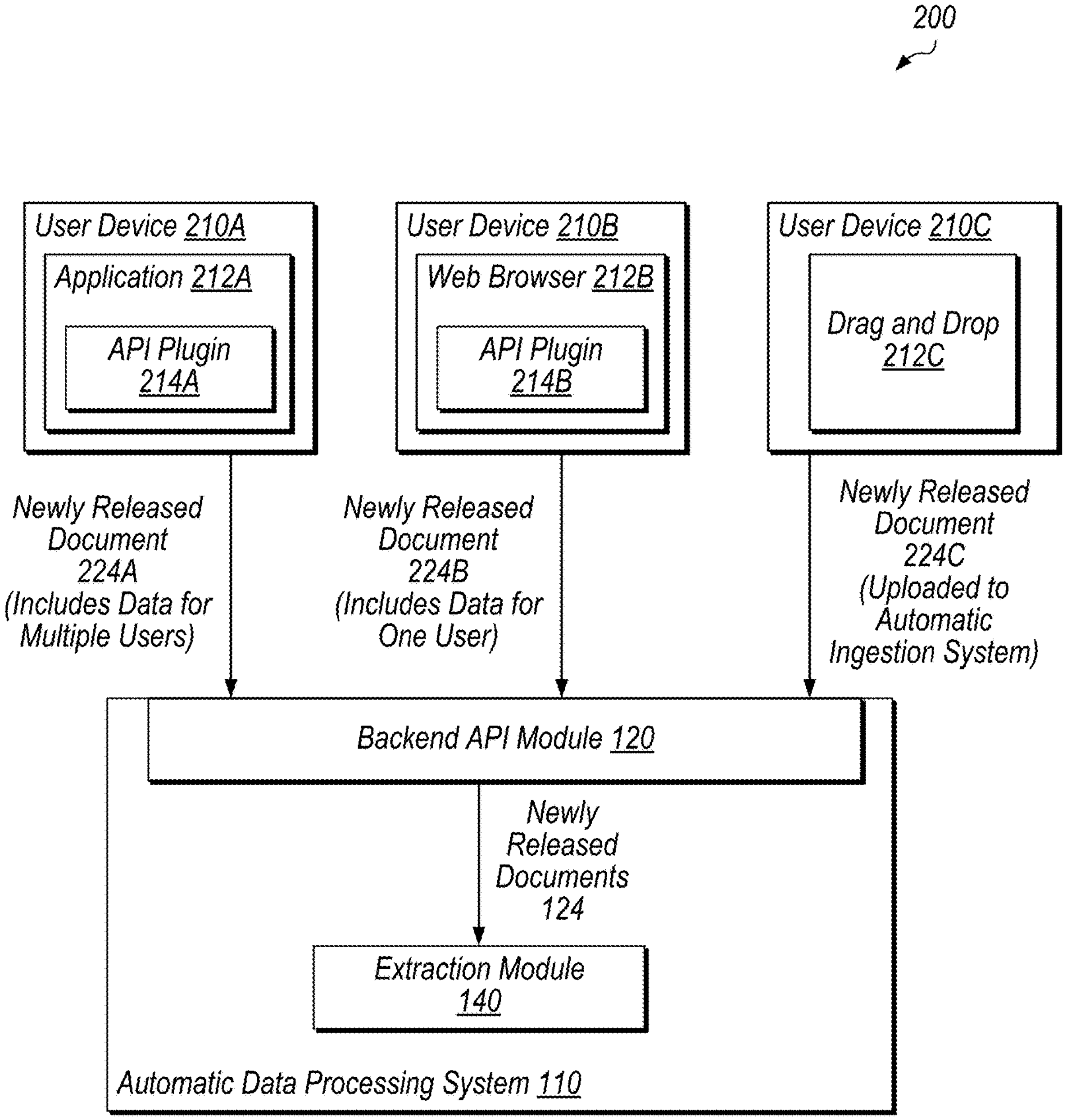
FIG. 2 is a block diagram depicting example automatic API ingestion, according to some embodiments.

The API plugins shown in FIG. 2 automatically ingest various types of documents into the backend API module 120 for extraction. For example, backend API module 120 may utilize API plugins to generate a pipeline from various sources to system 110 in order to process documents from one or more of the following sources: email, cloud storage (e.g., Dropbox™, Google Drive™), an account dashboard (e.g., of a user's account with their doctor), a messaging platform (such as Slack™, a text message, etc.). As discussed above with reference to user device 210C, a user may also drag and drop documents from e.g., their desktop to the user interface element provided by backend API module 120.

Example Data Extraction Module

Figure 3:
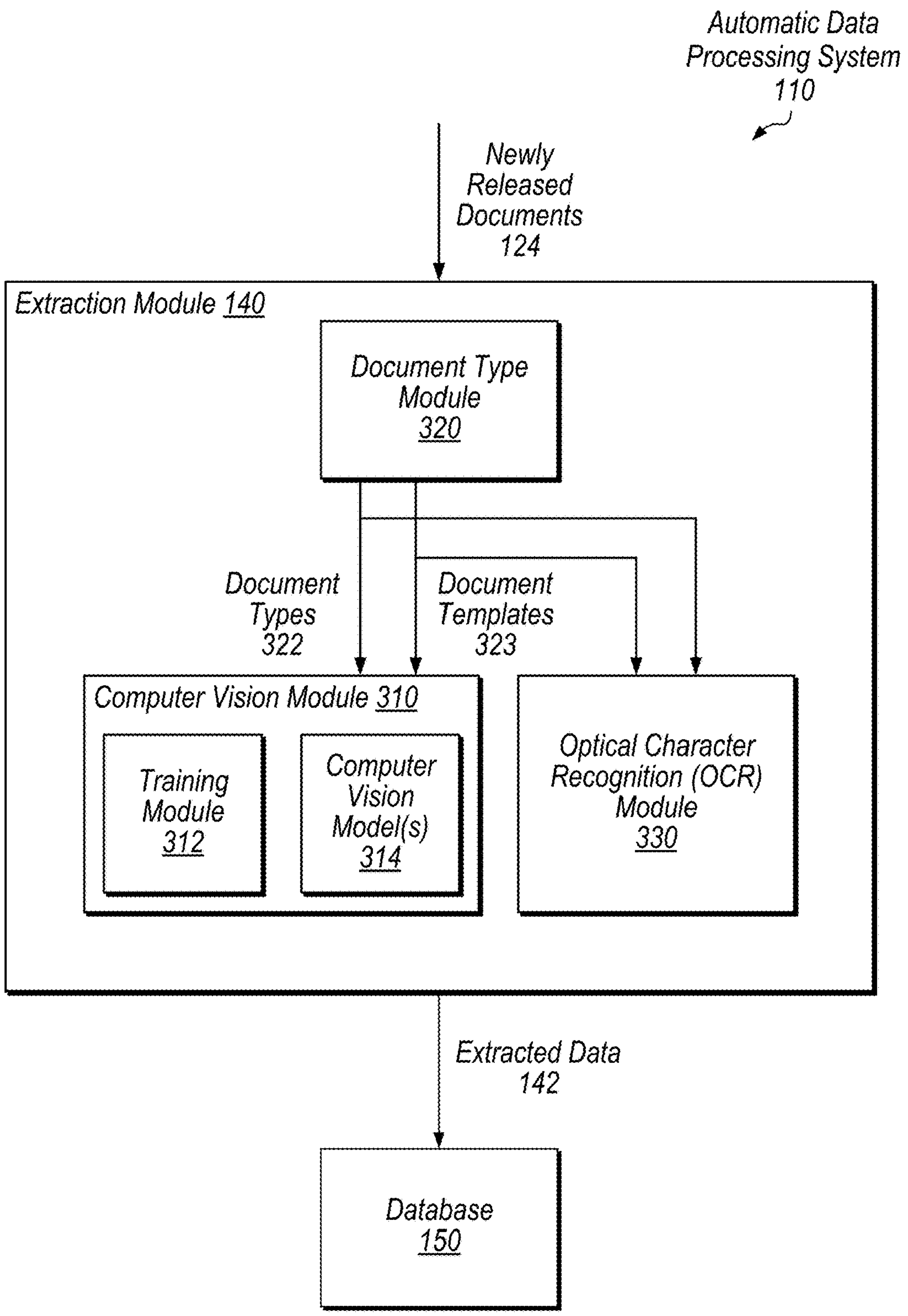
FIG. 3 is a block diagram illustrating an example data extraction module, according to some embodiments.

FIG. 3 is a block diagram illustrating an example data extraction module. In the illustrated embodiment, extraction module 140 includes document type module 320, optical character recognition module 320, and computer vision module 310, which in turn includes training module 312 and one or more computer vision models 314.

Extraction module 140 receives and inputs newly released documents 124 into document type module 320. In the illustrated embodiment, document type module 320 identifies which types of documents are included in the newly released documents 124. For example, document type module 320 may determine that a set of two new documents includes a medical record and an investment report. In the illustrated embodiment, document type module 320 sends the determined document types 322 to computer vision module 310 and OCR module 320. In some embodiments, document type module 320 executes a machine learning model to identify document types. For example, document type module 320 may train and execute a machine learning model that has been trained to identify, based on content included in documents, a type for these documents. In some situations, module 320 trains the machine learning model to identify document types using computer vision techniques. In the illustrated embodiment, based on the types of documents identified by the trained machine learning model, document type module 320 selects and transmits document templates 323 corresponding to the identified document types to both computer vision module 310 and OCR module 330. In some embodiments, document type module 320 generates document templates 323 using OCR techniques.

Computer vision module 310 executes training module 312 to train one or more computer vision models 314 to identify locations in documents from which to extract user data. In some embodiments, training module 312 trains a single computer vision model 314 on a plurality of different types of documents. In other embodiments, training module 312 trains multiple different computer vision models 314. For example, training module 312 may train individual computer vision models to perform data identification and location on different document types. In such situations, training module 312 inputs a first set of documents identified as a first type into a first computer vision model and a second set of documents identified as a second type into a second, different computer vision model during training. Based on the output of the models during training, module 312 adjust various weights of or inputs to the models. When training models 314 customized to document type, module 310 may also input a document template 323 corresponding to the type of document this model is being trained on.

After training computer vision model(s) 314, computer vision module 310 uses these trained models to identify and extract user data from newly released documents 1124 and stores this extracted data in database 150. In some embodiments, the trained computer vision model(s) simply locate user data within documents, and then computer vision module 310 feeds this information into OCR module 330 which extracts the located user data. In some embodiments, in addition to feeding newly released documents 124 into trained computer vision models 314, extraction module 140 inputs the documents into OCR module 330. OCR module 330 is executable by extraction module 140 to identify various characters within the newly released documents 124 and then, based on the identified characters, determine a document type for this document. OCR module 330 may use document templates 323 to extract data from one or more portions of the document that are specified as important in the document templates 323. For example, a document template 323 for a medical record may specify that the top right corner of a medical record will include user data (e.g., patient name, date of birth, diagnosis, etc.) to be extracted.

In some embodiments, instead of receiving document templates 323 from document type module 320, computer vision module 310 generates document templates 323. For example, computer vision module 310 may execute computer vision model(s) 314 to generate document templates 323 based on document types 322 specified by module 320. In some embodiments, extraction module 140 runs newly released documents 124 through both computer vision model(s) 314 and OCR module 330. For example, module 140 may perform a training phase in which it compares the output of module 310 and module 330 for previously released documents for which data has already been extracted. Based on this training phase, module 140 may determine which techniques to use for extraction of user data from newly released documents 124. This process may be cyclical in that module 140 performs a training phase before determining which of module 310 and 330 to use for extraction each time a new document is released. In other embodiments, extraction module 140 generates a combination of the data extracted by computer vision module 310 and OCR module 330 prior to storing the extracted data 142 in database.

Example Data Conversion and Availability

Figure 4:
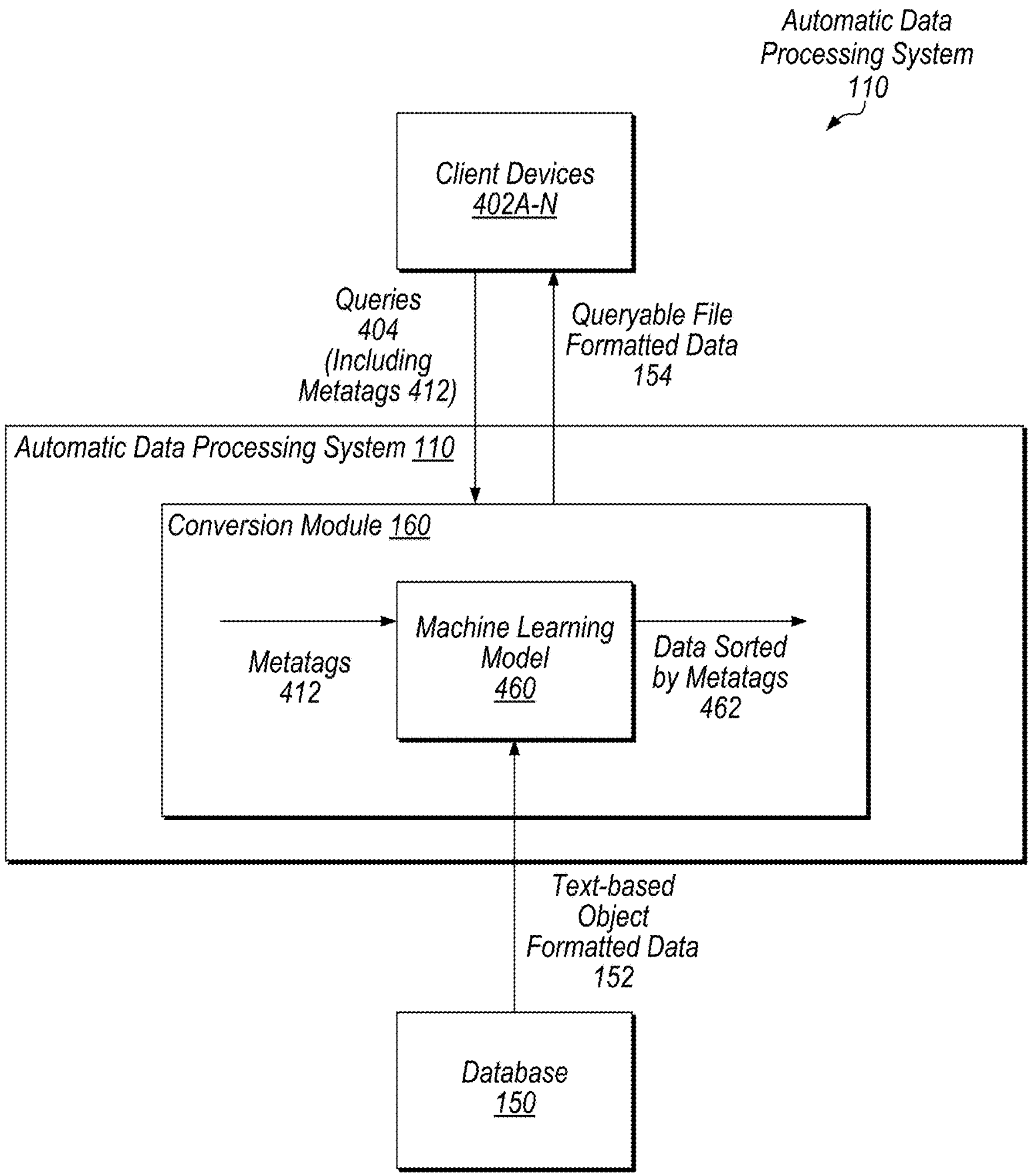
FIG. 4 is a block diagram depicting example data conversion, according to some embodiments.

FIG. 4 is a block diagram depicting example data conversion. In the illustrated embodiment, client devices 402A-N communicate with automatic data processing system 110 to retrieve queryable file formatted data 154 based on text-based object formatted data 152 stored in database 150.

Client devices 402A-402N send queries 404 that include metatags 412 to automatic data processing system 110. System 110, in the illustrated embodiment, executes conversion module 160 to retrieve and convert user data stored in database 150. Conversion module 160, in the illustrated embodiment, retrieves text-based object formatted data from database 150 based on receiving a query 404 from at least one client device 402. Conversion module 160 then feeds this data and metatags 412 included in the received query 404 into a machine learning model trained to convert text-based formatted data to a queryable file format. For example, conversion module 160 may generate an excel file from the data 462 sorted by metatags with columns representing the metatags and rows showing the values queried from the JSON document for each of the metatags. Metatags may include any of various attributes of user data, including, but not limited to: account number, user name, relative's names, users linked to this user in the database, account value change, medical diagnoses, total number of assets, accounting number, glasses prescription, insurance number, etc. In other situations, machine learning model 460 receives metatags 412 as input and, based on these tags, retrieves text-based object formatted data from database 150 and, then converts the retrieved data to a format that is sorted by the metatags. For example, in some embodiments, conversion module 160 supplies metatags for retrieving and converting data rather than the metatags coming from an end user in the form of a query. For example, conversion module 160 automatically retrieves and places data in a new format without receiving input from client devices 402A-402N.

In disclosed embodiments, while the JSON formatted database 150 is queryable by end users (of client devices 402), the disclosed techniques automatically generate e.g., CSV or excel files for distribution to these clients based on metatags recognized within the JSON objects. For example, conversion module 160 trains machine learning model 460 on metatags 412 to recognize a term like "account number" (one example of a metatag) and approximately where values are located in the JSON database that match this term (metatag). Once machine learning model 460 has located these values, conversion module 160 moves these values into a structured data format (e.g., a CSV or excel file listing account names, values, changes, dates, etc.). In the illustrated embodiment, system 110 provides queryable file formatted data 154 to client devices 402A-402N. This converted data 154 is usable by client devices to generate summaries, reports, graphs, etc. for distribution to appropriate entities or end users. As one specific example, client devices 402 may generate a graph showing the quarterly or yearly performance of a given user's electronic transaction account based on the queryable file formatted data 154 received from automatic data processing system 110 and provide this graph to the user.

As one specific example, an enterprise system (one example of system 110) such as Salesforce may include an investment portfolio management cloud that manages private user data being stored and organized within Salesforce. This information is provided to portfolio managers (e.g., a given client has several family members with X assets that the portfolio manager is in charge of and they are connected by Y set of data in the database). In this example, database 150 and the conversion module 160 are crucial to the portfolio managers being able to quickly and accurately retrieve investment reports from database 150 prior to making investment decisions for a given user or one or more of their family members. For example, system 110 makes database 150 queryable and indexable within the JSON format e.g., by using a trained machine learning model to retrieve, based on metatags, desired user financial data from the database 150 for a portfolio manager. Further in this example, the service cloud (one example of system 110) may automatically ingest private investment reports as soon as they become available in order to update user portfolio data stored and organized within a Salesforce database and provided to private portfolio managers. For example, a given client may have family members with various different assets that a portfolio manager needs to be aware of when managing a portfolio for the given client and the database provides these relationships as well as various relationship information for the given client.

The conversion techniques provided by conversion module 160 may advantageously allow automatic data processing system 110 to receive data in a format that is non-native to system 110 and database 150, and convert this data either back to an original form in which it was received (after combining them with data previously stored in database 150) or to a form that is easily queried and indexed (e.g., a more user-friendly format). Such techniques advantageously remove the need to alter database 150 to accommodate a different data format. This may be especially beneficial when database 150 is already storing a large amount of data (in which case alteration of the database itself may require an extensive amount of computing resources and bandwidth).

Example Method

Figure 5:
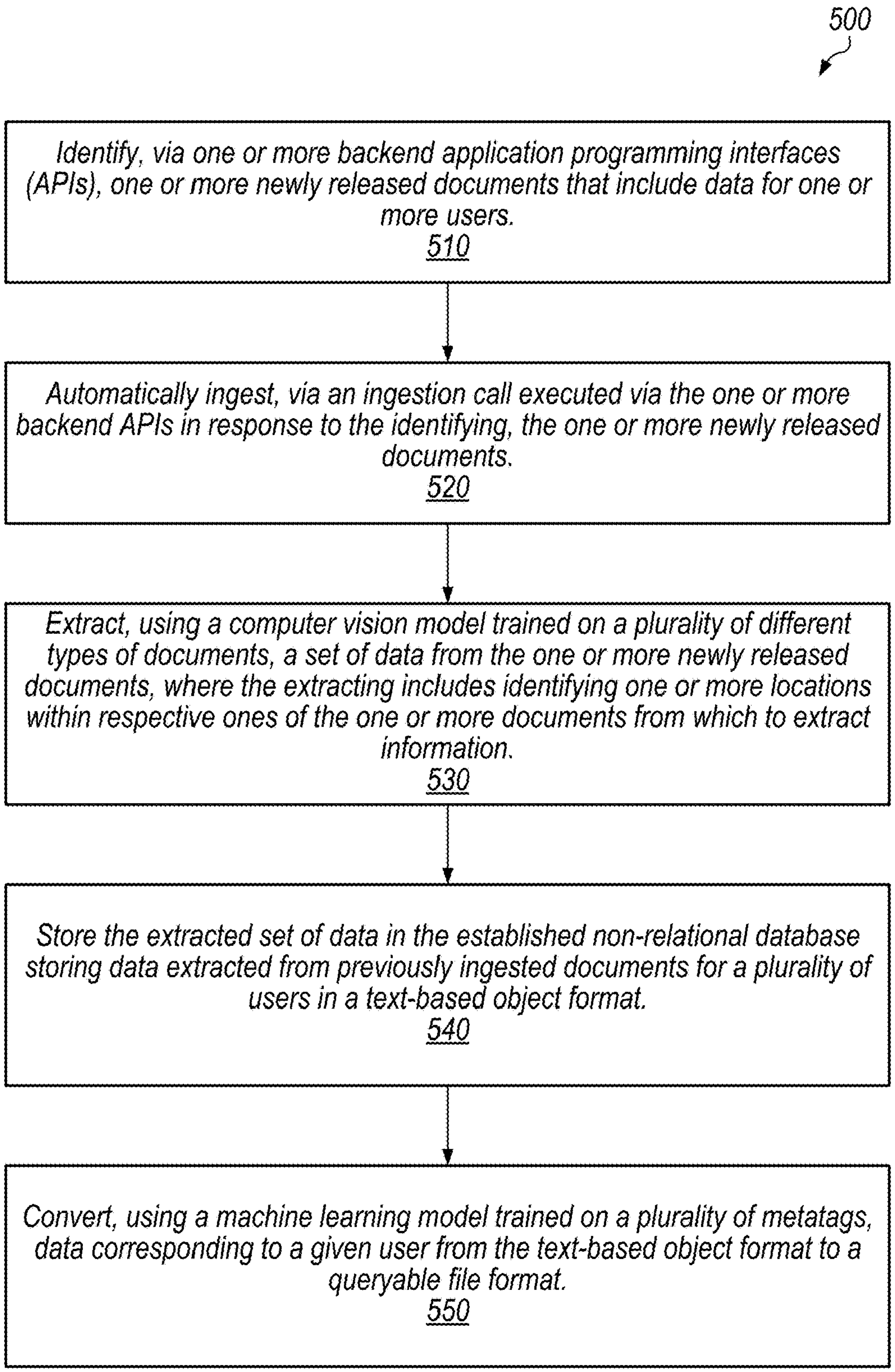
FIG. 5 is an example method for automatically ingesting newly released documents and storing data extracted from the newly released documents in an established document database for conversion into a different format, according to some embodiments.

FIG. 5 is a flow diagram depicting an example method for automatically ingesting newly released documents and storing data extracted from the newly released documents in an established document database for conversion into a different format, according to some embodiments. The method 500 shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 500 is performed by automatic data processing system 110.

At 510, in the illustrated embodiment, execution of method 500 includes identifying, via one or more backend application programming interfaces (APIs), one or more newly released documents that include data for one or more users. In some embodiments, at least one of the one or more backend APIs is a plugin at an application downloaded on a computing device of one of the users for which a server system is processing the one or more newly released documents. In some embodiments, the one or more newly released documents are received at a user computing device via email. For example, a user may receive a new document specifying medical results in a new email from their doctor. In some embodiments, the one or more newly released documents are received at a user computing device of one of the one or more users via a cloud storage service. For example, the cloud storage service might be Google Drive™. In some embodiments, the one or more newly released documents are one or more types of the following types of documents: manufacturing and quality control documents, financial reports, medical records, invoices, and accounting documents.

At 520, execution of method 500 further includes automatically ingesting, via an ingestion call executed via the one or more backend APIs in response to the identifying, the one or more newly released documents. In some embodiments, the one or more newly released documents include one or more formats of the following document formats: portable document format (PDF), text-based, media, comma-separated values (CSV), binary file format, and hypertext markup language (HTML).

At 530, execution of method 500 further includes extracting, using a computer vision model trained on a plurality of different types of documents, a set of data from the one or more new documents, where the extracting includes identifying one or more locations within the document from which to extract information. In some embodiments, the computer vision model trained on the plurality of different types of documents includes multiple different unique computer vision model that are customized to at least one of the newly released documents. In some embodiments, training one of the unique computer vision models includes inputting a previously stored document and a document type for the previously stored document into the unique computer vision model. In some embodiments, training one of the unique computer vision models includes adjusting, based on data identified by the unique computer vision model within the previously stored document, one or more weights of the model.

In some embodiments, execution of method 500 includes identifying, during the extracting using the computer vision model, that at least one of the one or more newly released documents is an unknown document type. In some embodiments, the server system transmits, to a system administrator associated with the one or more backend APIs, a notification indicating that an unknown document type has been identified, where the notification includes a request to retrain the computer vision model to extract data from documents of the unknown document type.

At 540 execution of method 500 further includes storing the extracted set of data in a nonrelational database storing data extracted from previously ingested documents for a plurality of users in a text-based object format. In some embodiments, the text-based object format is a JavaScript object notation (JSON) format that stores data as JSON objects (e.g., arrays).

At 550, execution of method 500 further includes converting, using a machine learning model trained on a plurality of metatags, data corresponding to a given user from the text-based object format to a queryable file format. In some embodiments, converting the data includes converting from a JSON format to a spreadsheet format (e.g., CSV or excel). In some embodiments, execution of the method 500 further includes automatically generating, using a machine learning model trained using a plurality of metatags, queryable files for respective ones of the plurality of users, where the generating includes querying the non-relational database storing data in the text-based object format according to the plurality of metatags. For example, system 110 may generate a CSV or excel file for a particular user by querying the non-relational database storing data from documents for multiple different users in a JSON format. In some embodiments, the plurality of metatags are received in the form of one or more queries from one or more client computing devices, where the plurality of metatags specify a plurality of different user data attributes to be retrieved from the database storing data in the text-based object format.

In some embodiments, training the computer vision model on the plurality of different types of documents includes continuously inputting a set of training data into the computer vision model, where respective ones of the sets of training data include a previously stored document and a document type for the previously stored document. In some embodiments, training the computer vision model on the plurality of different types of documents includes continuously adjusting, based on data identified by the computer vision model within the previously stored document, one or more weights of the model, where the training includes teaching the computer vision model to identify document types and to identify user data to extract from the documents based on an identified document type.

In some embodiments, the automatic ingesting, extracting, and converting are performed by a server system. The server system may be system 110, for example. In some embodiments, the server system determines, based on information extracted from the one or more newly released documents and one or more previously stored documents stored in the non-relational database with an identifier corresponding to a particular user of the one or more users, whether to alter one or more aspects of an account of the particular user with the server system.

In some embodiments, execution of method 500 further includes receiving, one or more additional newly released documents, from one or more users, where the one or more additional newly released documents are received by a web service directly from computing devices of the one or more users without one of the one or more backend APIs automatically ingesting the documents, where the web service receives the additional newly released documents via a drag-and-drop user interface element displayed at the computing devices of the one or more users. In some embodiments, the identifying, automatically ingesting, extracting, storing, and converting are performed by a server system, where at least one of the one or more backend APIs is a plugin at an application downloaded on a computing device of a user for which the server system is processing the one or more newly released documents.

Exemplary Multi-Tenant Database System

Figure 6:
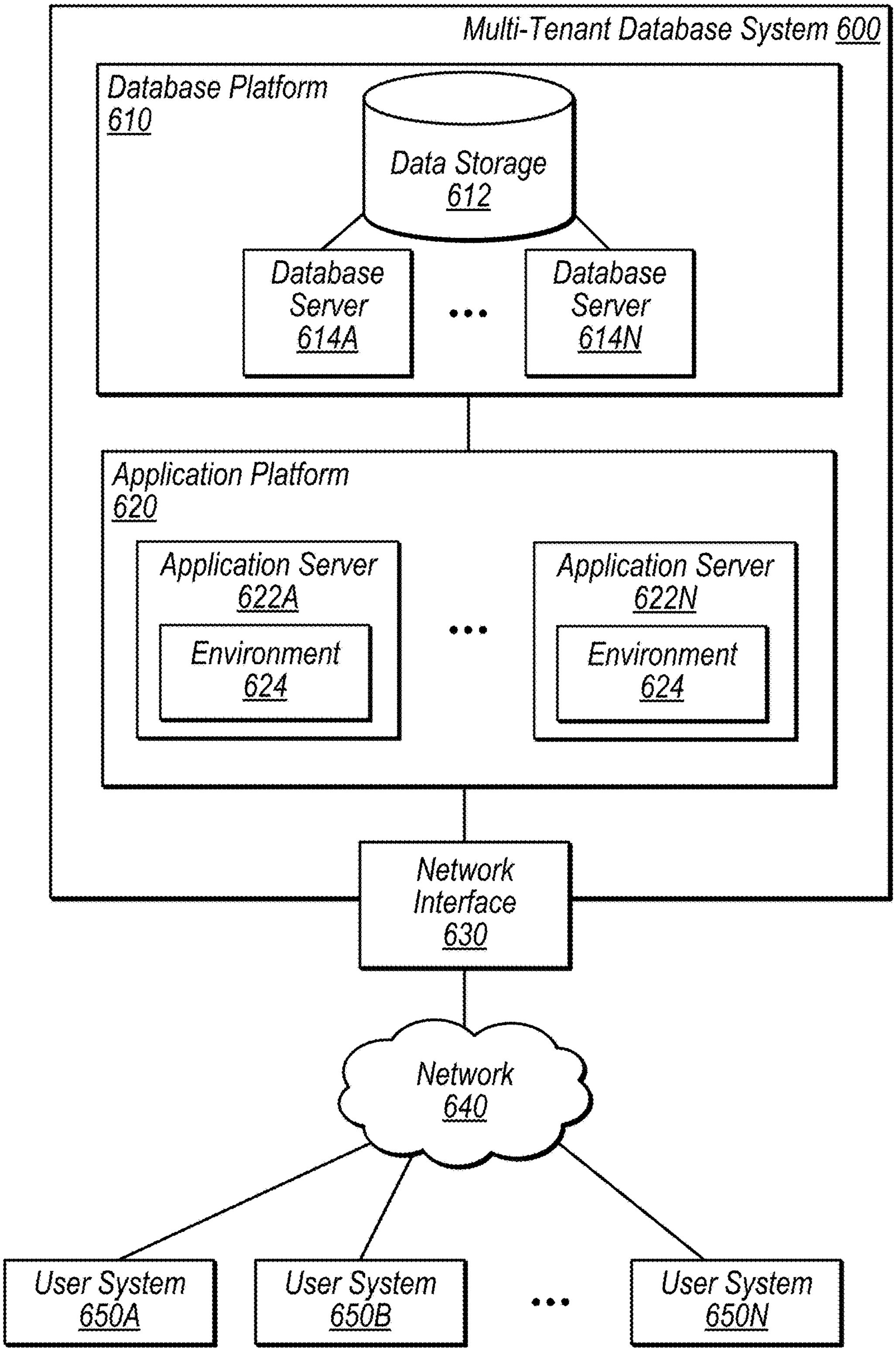
FIG. 6 is a block diagram illustrating elements of a multi-tenant system, according to some embodiments.

Turning now to FIG. 6, an exemplary multi-tenant database system (MTS) 600 in which various techniques of the present disclosure can be implemented is shown—e.g., system 100 may be MTS 600. In FIG. 6, MTS 600 includes a database platform 610, an application platform 620, and a network interface 630 connected to a network 640. Also as shown, database platform 610 includes a data storage 612 and a set of database servers 614A-N that interact with data storage 612, and application platform 620 includes a set of application servers 622A-N having respective environments 624. In the illustrated embodiment, MTS 600 is connected to various user systems 650A-N through network 640. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 600, in various embodiments, is a set of computer systems that together provide various services to users (alternatively referred to as "tenants") that interact with MTS 600. In some embodiments, MTS 600 implements a customer relationship management (CRM) system that provides mechanism for tenants (e.g., companies, government bodies, etc.) to manage their relationships and interactions with customers and potential customers. For example, MTS 600 might enable tenants to store customer contact information (e.g., a customer's website, email address, telephone number, and social media data), identify opportunities, record service issues, and manage marketing campaigns. MTS 600 may also enable those tenants to identify how customers have been communicated with, what the customers have bought, when the customers last purchased items, and what the customers paid. To provide the services of a CRM system and/or other services, as shown, MTS 600 includes a database platform 610 and an application platform 620.

Database platform 610, in various embodiments, is a combination of hardware elements and software routines that implement database services for storing and managing data of MTS 600, including tenant data. As shown, database platform 610 includes data storage 612. Data storage 612, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 612 is used to implement a database (e.g., database 150) comprising a collection of information that is organized in a way that allows for access, storage, and manipulation of the information. Data storage 612 may implement a single database, a distributed database, a collection of distributed databases, a database with redundant online or offline backups or other redundancies, etc. As part of implementing the database, data storage 612 may store files (e.g., queryable files generated by conversion module 160) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 600 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 612 is organized as part of a log-structured merge-tree (LSM tree). An LSM tree normally includes two high-level components: an in-memory buffer and a persistent storage. In operation, a database server 614 may initially write database records into a local in-memory buffer before later flushing those records to the persistent storage (e.g., data storage 612). As part of flushing database records, the database server 614 may write the database records into new files that are included in a "top" level of the LSM tree. Over time, the database records may be rewritten by database servers 614 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 612.

When a database server 614 wishes to access a database record for a particular key, the database server 614 may traverse the different levels of the LSM tree for files that potentially include a database record for that particular key. If the database server 614 determines that a file may include a relevant database record, the database server 614 may fetch the file from data storage 612 into a memory of the database server 614. The database server 614 may then check the fetched file for a database record having the particular key. In various embodiments, database records are immutable once written to data storage 612. Accordingly, if the database server 614 wishes to modify the value of a row of a table (which may be identified from the accessed database record), the database server 614 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 614, in various embodiments, are hardware elements, software routines, or a combination thereof capable of providing database services, such as data storage, data retrieval, and/or data manipulation. A database server, such as automatic data processing system 110 or another database server system included in system 100 may correspond to database 150. Such database services may be provided by database servers 614 to components (e.g., application servers 622) within MTS 600 and to components external to MTS 600. As an example, a database server 614 may receive a database transaction request from an application server 622 that is requesting data to be written to or read from data storage 612. The database transaction request may specify an SQL SELECT command to select one or more rows from one or more database tables. The contents of a row may be defined in a database record and thus database server 614 may locate and return one or more database records that correspond to the selected one or more table rows. In various cases, the database transaction request may instruct database server 614 to write one or more database records for the LSM tree-database servers 614 maintain the LSM tree implemented on database platform 610. In some embodiments, database servers 614 implement a relational database management system (RDMS) or object oriented database management system (OODBMS) that facilitates storage and retrieval of information against data storage 612. In various cases, database servers 614 may communicate with each other to facilitate the processing of transactions. For example, database server 614A may communicate with database server 614N to determine if database server 614N has written a database record into its in-memory buffer for a particular key.

Application platform 620, in various embodiments, is a combination of hardware elements and software routines that implement and execute CRM software applications as well as provide related data, code, forms, web pages and other information to and from user systems 650 and store related data, objects, web page content, and other tenant information via database platform 610. In order to facilitate these services, in various embodiments, application platform 620 communicates with database platform 610 to store, access, and manipulate data. In some instances, application platform 620 may communicate with database platform 610 via different network connections. For example, one application server 622 may be coupled via a local area network and another application server 622 may be coupled via a direct network link. Transfer Control Protocol and Internet Protocol (TCP/IP) are exemplary protocols for communicating between application platform 620 and database platform 610, however, it will be apparent to those skilled in the art that other transport protocols may be used depending on the network interconnect used.

Application servers 622, in various embodiments, are hardware elements, software routines, or a combination thereof capable of providing services of application platform 620, including processing requests received from tenants of MTS 600. Application servers 622, in various embodiments, can spawn environments 624 that are usable for various purposes, such as providing functionality for developers to develop, execute, and manage applications (e.g., business logic). Data may be transferred into an environment 624 from another environment 624 and/or from database platform 610. In some cases, environments 624 cannot access data from other environments 624 unless such data is expressly shared. In some embodiments, multiple environments 624 can be associated with a single tenant.

Application platform 620 may provide user systems 650 access to multiple, different hosted (standard and/or custom) applications, including a CRM application and/or applications developed by tenants. In various embodiments, application platform 620 may manage creation of the applications, testing of the applications, storage of the applications into database objects at data storage 612, execution of the applications in an environment 624 (e.g., a virtual machine of a process space), or any combination thereof. In some embodiments, application platform 620 may add and remove application servers 622 from a server pool at any time for any reason, there may be no server affinity for a user and/or organization to a specific application server 622. In some embodiments, an interface system (not shown) implementing a load balancing function (e.g., an F5 Big-IP load balancer) is located between the application servers 622 and the user systems 650 and is configured to distribute requests to the application servers 622. In some embodiments, the load balancer uses a least connections algorithm to route user requests to the application servers 622. Other examples of load balancing algorithms, such as are round robin and observed response time, also can be used. For example, in certain embodiments, three consecutive requests from the same user could hit three different servers 622, and three requests from different users could hit the same server 622.

In some embodiments, MTS 600 provides security mechanisms, such as encryption, to keep each tenant's data separate unless the data is shared. If more than one server 614 or 622 is used, they may be located in close proximity to one another (e.g., in a server farm located in a single building or campus), or they may be distributed at locations remote from one another (e.g., one or more servers 614 located in city A and one or more servers 622 located in city B). Accordingly, MTS 600 may include one or more logically and/or physically connected servers distributed locally or across one or more geographic locations.

One or more users (e.g., via user systems 650) may interact with MTS 600 via network 640. User system 650 may correspond to, for example, a tenant of MTS 600, a provider (e.g., an administrator) of MTS 600, or a third party. Each user system 650 may be a desktop personal computer, workstation, laptop, PDA, cell phone, or any Wireless Access Protocol (WAP) enabled device or any other computing device capable of interfacing directly or indirectly to the Internet or other network connection. User system 650 may include dedicated hardware configured to interface with MTS 600 over network 640. User system 650 may execute a graphical user interface (GUI) corresponding to MTS 600, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 650 to access, process, and view information and pages available to it from MTS 600 over network 640. Each user system 650 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 600 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 650 may be users in differing capacities, the capacity of a particular user system 650 might be determined one or more permission levels associated with the current user. For example, when a user is using a particular user system 650 to interact with MTS 600, that user system 650 may have capacities (e.g., user privileges) allotted to that user. But when an administrator is using the same user system 650 to interact with MTS 600, the user system 650 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 600 that are allocated at the tenant level while other data structures are managed at the user level.

In some embodiments, a user system 650 and its components are configurable using applications, such as a browser, that include computer code executable on one or more processing elements. Similarly, in some embodiments, MTS 600 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 640 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 650 may communicate with MTS 600 using TCP/IP and, at a higher network level, use other common Internet protocols to communicate, such as HTTP, FTP, AFS, WAP, etc. For example, where HTTP is used, user system 650 might include an HTTP client commonly referred to as a "browser" for sending and receiving HTTP messages from an HTTP server at MTS 600. Such a server might be implemented as the sole network interface between MTS 600 and network 640, but other techniques might be used as well or instead. In some implementations, the interface between MTS 600 and network 640 includes load sharing functionality, such as round-robin HTTP request distributors to balance loads and distribute incoming HTTP requests evenly over a plurality of servers.

In various embodiments, user systems 650 communicate with application servers 622 to request and update system-level and tenant-level data from MTS 600 that may require one or more queries to data storage 612. In some embodiments, MTS 600 automatically generates one or more SQL statements (the SQL query) designed to access the desired information. In some cases, user systems 650 may generate requests having a specific format corresponding to at least a portion of MTS 600. As an example, user systems 650 may request to move data objects into a particular environment 624 using an object notation that describes an object relationship mapping (e.g., a JavaScript object notation mapping) of the specified plurality of objects.

Exemplary Computer System

Figure 7:
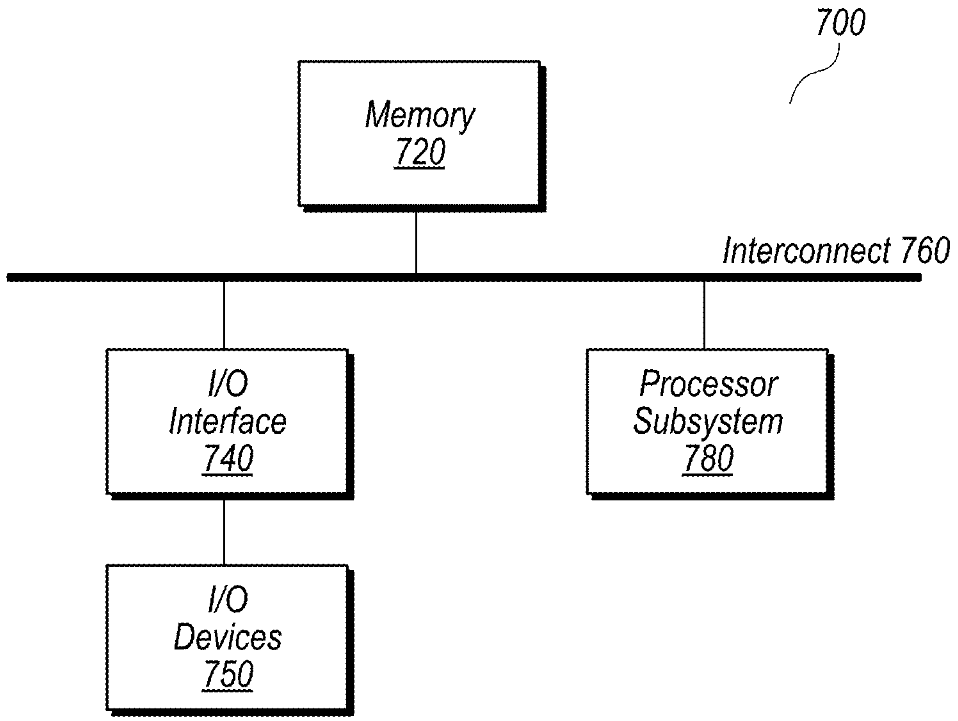
FIG. 7 is a block diagram illustrating elements of a computer system configured to implement various systems described in the present disclosure, according to some embodiments.

Turning now to FIG. 7, a block diagram of an exemplary computer system 700, which may implement system 100, database 150, MTS 600, and/or user system 650, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement automatic data processing system 110 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over Wi-Fi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

extracting, using a computer vision model, a set of data from one or more newly released documents, wherein the extracting includes identifying one or more locations within the one or more documents from which to extract information, and wherein the computer vision model is trained by inputting at least a previously stored document, a document type for the previously stored document, and a document template corresponding to the document type into the computer vision model;

storing the extracted set of data in a database, wherein the database stores data extracted from ingested documents for a plurality of users in a text-based object format; and converting, by inputting a set of metatags into a machine learning model, data corresponding to a given user from the text-based object format to a queryable file format sorted according to the set of metatags.

2. The method of claim 1, further comprising prior to the extracting:

identifying, via one or more backend application programming interfaces (APIs), the one or more newly released documents; and automatically ingesting, via an ingestion call executed via the one or more backend APIs in response to the identifying, the one or more newly released documents, wherein at least one of the one or more backend APIs is a plugin at an application downloaded on a computing device of one of the users for which the one or more newly released documents are being processed.

3. The method of claim 2, wherein the extracting, the storing, and the converting are performed by a server system, and wherein the method further comprises:

determining, by the server system based on information extracted from the one or more newly released documents and one or more previously stored documents stored in the database with an identifier corresponding to a particular user of the one or more users, whether to alter one or more aspects of an account of the particular user with the server system.

4. The method of claim 1, further comprising:

automatically generating the set of metatags corresponding to a plurality of attributes of data stored in the database, wherein the converting includes querying the database storing data in the text-based object format according to the set of metatags.

5. The method of claim 1, further comprising:

identifying, during the extracting using the computer vision model, that at least one of the one or more newly released documents is an unknown document type; and transmitting, to a system administrator, a notification indicating that an unknown document type has been identified.

6. The method of claim 5, further comprising:

in response to transmitting the notification, receiving a retrained version of the computer vision model, trained to extract data from documents of the unknown document type.

7. The method of claim 1, further comprising:

receiving, by a web service directly from one or more computing devices, one or more additional newly released documents, wherein the web service receives the one or more additional newly released documents via a drag-and-drop user interface element displayed at the computing devices of the one or more users.

8. The method of claim 1, wherein the one or more newly released documents include one or more formats of the following document formats: portable document format (PDF), comma-separated values (CSV), and hypertext markup language (HTML).

9. A non-transitory computer-readable medium having instructions stored thereon that are capable of causing a system to implement operations comprising:

extracting, using a computer vision model, a set of data from one or more newly released documents, wherein the extracting includes identifying one or more locations within the one or more newly released documents from which to extract information, and wherein the computer vision model is trained by inputting at least a previously stored document, a document type for the previously stored document, and a document template corresponding to the document type into the computer vision model;

storing the extracted set of data in a database storing data extracted from previously ingested documents for a plurality of users in a text-based object format; and converting, using a machine learning model based on a set of metatags, data corresponding to a given user from the text-based object format to a queryable file format sorted according to the set of metatags.

10. The non-transitory computer-readable medium of claim 9, wherein the operations further comprise:

receiving, by a web service directly from one or more computing devices, one or more additional newly released documents, wherein the web service receives the one or more additional newly released documents via a drag-and-drop user interface element displayed at the computing devices of the one or more users.

11. The non-transitory computer-readable medium of claim 9, wherein the one or more newly released documents include one or more formats of the following document formats: portable document format (PDF), comma-separated values (CSV), and hypertext markup language (HTML).

12. The non-transitory computer-readable medium of claim 9, wherein the database is a non-relational database, and wherein the converting includes:

querying the non-relational database storing data in the text-based object format according to the set of metatags.

13. The non-transitory computer-readable medium of claim 9, wherein the operations further comprise:

receiving a plurality of additional metatags in the form of one or more queries from one or more client computing devices, wherein the plurality of additional metatags specify a plurality of different user data attributes to be retrieved from the database storing data in the text-based object format.

14. The non-transitory computer-readable medium of claim 9, wherein the operations further comprise:

automatically ingesting, via an ingestion call executed via one or more backend application programming interfaces (APIs), the one or more newly released documents that are received at a user computing device of one or more users via a cloud storage service, wherein at least one of the one or more backend APIs is a plugin at an application of a computing device for which the one or more newly released documents are being processed.

15. A system, comprising:

at least one processor; and a memory having instructions stored thereon that are executable by the at least one processor to cause the system to perform operations comprising:

extracting, using a computer vision model, a set of user data from one or more newly released documents, wherein the extracting includes identifying one or more locations within the one or more newly released documents from which to extract information, and wherein the computer vision model is trained by inputting at least a previously stored document, a document type for the previously stored document, and a document template corresponding to the document type into the computer vision model;

storing the extracted set of user data in an existing database storing data extracted from previously ingested documents for a plurality of users in a text-based object format; and converting, by inputting a set of metatags into a machine learning model, data corresponding to a given user from the text-based object format to a queryable file format sorted according to the set of metatags.

16. The system of claim 15, wherein the instructions are further executable by the at least one processor to cause the system to perform operations comprising prior to the extracting:

automatically ingesting, via an ingestion call executed via one or more backend application programming interfaces (APIs) in response to the identifying, the one or more newly released documents, wherein at least one of the one or more backend APIs is a plugin at an application of a computing device of one of the one or more users for which a server system is processing the one or more newly released documents.

17. The system of claim 15, wherein the one or more newly released documents include one or more formats of the following document formats: portable document format (PDF), comma-separated values (CSV), and hypertext markup language (HTML).

18. The system of claim 15, wherein the converting includes querying the database storing data in the text-based object format according to the set of metatags.

19. The system of claim 15, wherein the one or more newly released documents are one or more types of the following types of documents: quality control documents, financial documents, and medical records.

20. The system of claim 15, wherein the instructions are further executable by the at least one processor to cause the system to perform operations comprising:

identifying, during the extracting using the computer vision model, that at least one of the one or more newly released documents is an unknown document type; and transmitting, to a system administrator, a notification indicating that an unknown document type has been identified.

* * * * *